(12) United States Patent
Kashi

(10) Patent No.: US 9,323,333 B2
(45) Date of Patent: Apr. 26, 2016

(54) DETECTING PATTERNS WITH PROXIMITY SENSORS

(75) Inventor: Ramanujan Kashi, Magarpatta (IN)

(73) Assignee: Avaya Inc., Basking Ridge, NJ (US)

( * ) Notice: Subject to any disclaimer, the term of this patent is extended or adjusted under 35 U.S.C. 154(b) by 504 days.

(21) Appl. No.: 12/639,883

(22) Filed: Dec. 16, 2009

(65) Prior Publication Data

US 2011/0140904 A1     Jun. 16, 2011

(51) Int. Cl.
   *G08B 21/00*   (2006.01)
   *G06F 3/01*    (2006.01)
   *G06F 1/32*    (2006.01)

(52) U.S. Cl.
   CPC .............. *G06F 3/017* (2013.01); *G06F 1/3231* (2013.01); *Y02B 60/1289* (2013.01)

(58) Field of Classification Search
   CPC ... G06F 1/3231; G06F 3/017; Y02B 60/1289; G08B 21/00; A47L 23/22; A47L 23/266; G01S 3/783; G01S 3/7865
   USPC ...................... 340/686.1, 686.6, 691.1–691.6; 327/517; 700/14, 15, 17, 19; 725/9, 10; 702/127; 705/7
   See application file for complete search history.

(56) References Cited

U.S. PATENT DOCUMENTS

| | | | | |
|---|---|---|---|---|
| 6,081,619 | A * | 6/2000 | Hashimoto et al. | 382/181 |
| 6,445,409 | B1 * | 9/2002 | Ito et al. | 348/155 |
| 6,701,271 | B2 * | 3/2004 | Willner et al. | 702/127 |
| 6,909,921 | B1 | 6/2005 | Bilger | |
| 2002/0173928 | A1 * | 11/2002 | Willner et al. | 702/127 |
| 2003/0063052 | A1 * | 4/2003 | Rebh | 345/76 |
| 2003/0066073 | A1 * | 4/2003 | Rebh | 725/12 |
| 2003/0126013 | A1 * | 7/2003 | Shand | 705/14 |
| 2003/0210258 | A1 * | 11/2003 | Williams | 345/700 |
| 2004/0119602 | A1 * | 6/2004 | Blum et al. | 340/815.4 |
| 2005/0030322 | A1 * | 2/2005 | Gardos | 345/667 |
| 2005/0223237 | A1 * | 10/2005 | Barletta et al. | 713/186 |
| 2006/0256140 | A1 * | 11/2006 | Turner | 345/690 |
| 2006/0279532 | A1 * | 12/2006 | Olszewski et al. | 345/156 |
| 2007/0150916 | A1 * | 6/2007 | Begole et al. | 725/10 |
| 2008/0077502 | A1 | 3/2008 | Boyd | |
| 2008/0167913 | A1 * | 7/2008 | Wiswell et al. | 705/7 |

FOREIGN PATENT DOCUMENTS

WO     WO 2008012716 A2 *   1/2008   .............. G09F 27/00

* cited by examiner

*Primary Examiner* — Amine Benlagsir
*Assistant Examiner* — Sisay Yacob
(74) *Attorney, Agent, or Firm* — Sheridan Ross P.C.

(57) ABSTRACT

A method, system, and computer-readable storage medium for displaying a message on a display according to a movement pattern of an object. The system first receives a first signal that indicates a presence of an object at a first location with respect to a display. Based on the first signal, the system then selects a message to display at the display. Finally, the system displays the message at the display based, at least in part, on a first temporal pattern associated with the first signal.

18 Claims, 4 Drawing Sheets

Display Device 100

DETECTING PATTERNS WITH PROXIMITY SENSORS

FIELD OF THE INVENTION

The present invention relates to display devices in general, and more particularly, to an electronic display device.

BACKGROUND OF THE INVENTION

Advancement in technology has brought message displaying techniques from placards to electronic display devices. Generally, most of the electronic display devices display a message regardless, whether the message is being watched/read by anyone. Some other devices display messages only when an object is in their close proximity.

SUMMARY OF THE INVENTION

The inventors of this subject matter have recognized that a message is displayed more effectively on a display device, if it is displayed according to the movement pattern of an object. For example, a message is exposed to a person for a longer duration of time, if the message is shifted (according to, or) along with the person while she is passing-by the display device. Furthermore, the display device could be used to simultaneously display multiple messages for multiple persons. Also, physical characteristics of a person could be determined from the movement pattern of a person. For example, movement pattern of hands, legs and neck of a kid of height less than 3 feet is different than movement pattern of an adult of height more than 5 feet. Ability to determine physical characteristics is advantageous, because the physical characteristics could be used for selecting messages for displaying. The above considerations, while displaying a message, provide unprecedented advantages, particularly, when commercial messages are being displayed.

Conventional display devices often employ a proximity detector. The proximity detector provides a binary signal that indicates presence or absence of an object in its close proximity. Based on the signal the display devices trigger start or end of displaying a message. Because of the binary nature of the signal, these devices have only two options. That is, a message is either displayed or not displayed. These devices do not account for the movement of the object. The present subject matter enables accounting for the movement without any or minimal additional cost. The present subject matter achieves this and other objectives by taking into consideration the manner in which the binary signal changes over a period of time.

The present subject matter provides a method and a system for displaying message without some of the disadvantages of the prior art. The present subject matter provides a number of ways to account for the movement of an object. In some other embodiments, a number of proximity detectors are employed with a display device. Each of the proximity detectors provides binary signals corresponding to an object in its vicinity. When the object is in motion, changes in the state of each of the binary signals create a temporal pattern according to the movement of the object.

Output from a detector is an indicative of the activities around the detector. In some embodiments, if the detector provides a steady square wave output pattern, this means one or more objects around the detector are in motion. In some embodiments, if the detector provides a step function output, which is steady at logical high then it means an object is in front of the detector. In some other embodiments, if the detector provides a step function which is steady at logical low, then it means no object is in front of the detector. The present subject matter exploits the temporal pattern of the outputs of the detector/s for displaying messages more effectively.

A message is displayed according to the temporal pattern. In some embodiments, the temporal pattern is analyzed to obtain characteristics of the object and the message is selected according to the characteristics. In some embodiments, the message is displayed on a proper subset of the display. The proper subset is selected according to the temporal pattern. In some other embodiments, based on the temporal pattern the message is shifted from one proper subset to another proper subset of the display.

According to an embodiment, the present subject matter provides, a method comprising: receiving a first signal, wherein the first signal is a time-varying binary signal that is indicative of the presence of an object at a first location with respect to a display; and transmitting a message to the display, wherein the message is displayed based, at least in part, on a first temporal pattern of the first signal.

According to another embodiment, the present subject matter provides a method comprising: receiving a first signal, wherein the first signal is a time-varying binary signal that is indicative of the presence of an object at a first location with respect to a display; and displaying a message on a proper subset of the display, wherein the subset is selected based, at least in part, on a first temporal pattern of the first signal.

DETAILED DESCRIPTION

Figure 1:
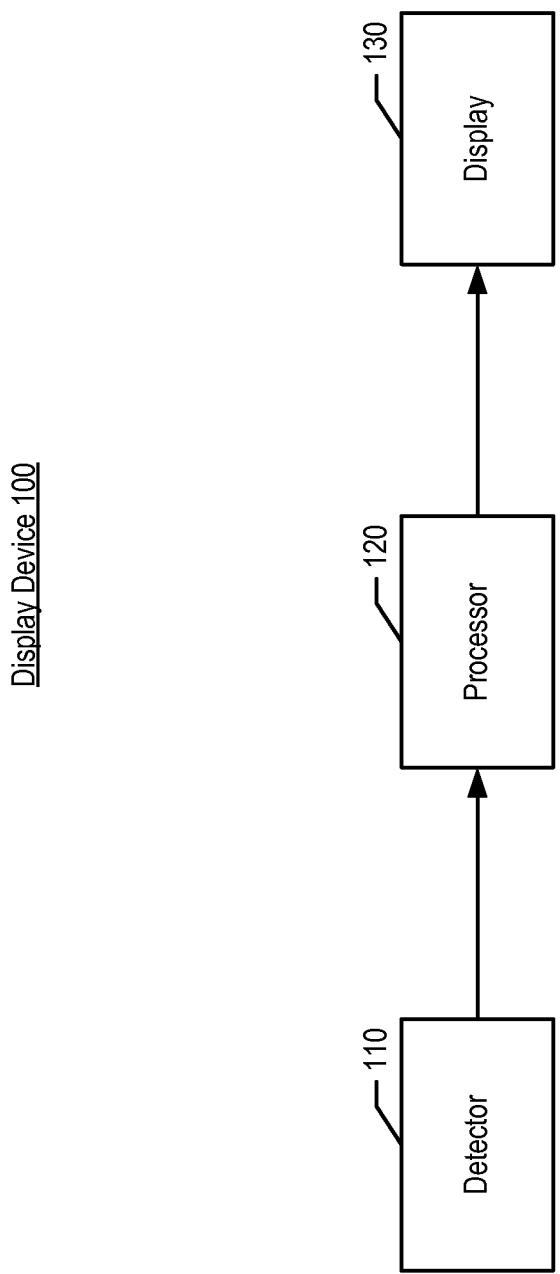
FIG. 1 depicts a schematic diagram of a display device according to an illustrative embodiment of the present subject matter.

FIG. 1 depicts a schematic diagram of display device 100. Display device 100 comprises detector 110, processor 120 and display 130. It will be clear to those skilled in the art, after reading this disclosure, how to make and use alternative embodiments of the present invention wherein, display device 100 comprises more or less than above recited elements.

In some embodiments, detector 110 is a proximity detector. In some embodiments, detector 110 is an infra-red detector. In some other embodiments, detector 110 is an ultrasound detector. In some other embodiments, detector 110 is combination of both infra-red and ultrasound detectors. In some other embodiments, detector 110 is an array of proximity detectors. For sake of brevity and clarity, the illustrative embodiment describes display device 100 wherein detector 110 is one or more proximity detectors, however a person skilled in the art would know, after reading this specification, how to use other type of detectors for practicing the invention.

In the illustrative embodiment, detector 100 generates a signal. The signal is a time varying binary signal. The signal is indicative of the presence of the object at a location with respect to display 130. In an embodiment, the signal comprises a temporal pattern. The temporal pattern is representative of the movement of the object. Detector 110 transmits the signal to processor 120. In some embodiments, detector 110 transmits the temporal pattern to processor 120. In yet further embodiments, detector 110 transmits both of the signal and temporal pattern to processor 120.

In some embodiments, detector 110 comprises a first proximity detector and a second proximity detector. The first proximity detector generates a first signal. The second proximity detector generates a second signal. The first and the second signals are time varying binary signals. The first signal is indicative of the presence of an object at a first location with respect to display 130. The second signal is indicative of the presence of the object a second locations second location with respect to display 130. The first signal comprises a first temporal pattern. The second signal comprises a second temporal pattern. In some embodiments, detector 110 transmits at least of the first signal, second signal, first temporal pattern and second temporal pattern to processor 120.

In some embodiments, number detectors 110 of varying sensitivity are employed. Detectors 110 generate a time varying binary signal. The signal is indicative of the distance of an object from display 130. The signal comprises a temporal pattern. The temporal pattern is indicative of the direction of motion of the object. According to this embodiment, a message is displayed on display 130, based on the temporal pattern of the signal. In some embodiments, the message is zoomed in or out according to the distance of the object from display 130.

Processor 120 is a general-purpose processor that is capable of performing the tasks described below and with respect to FIGS. 2 through 4. It will be clear to those skilled in the art, after reading this specification, how to make and use processor 120 and alternate embodiments of processor 120.

Display 130 is an output device for displaying messages. In some embodiments display 130 is capable of presenting both visual and audio messages. In some embodiments, display 130 is a digital display. In some other embodiments, display 130 includes a projector and a screen for projecting/displaying messages. It will be clear to those skilled in the art, after reading this specification how to make and use Light Emitting Diode (LED), digital, vacuum tube/cathode ray, electroluminescent, plasma, liquid crystal, organic LDE, surface-conduction electron-emitter, laser, holographic, carbon nanotubes, nano-crystal, Nixie tube, vector, plat panel, and other types of displays for the practicing the present subject matter.

Figure 2:
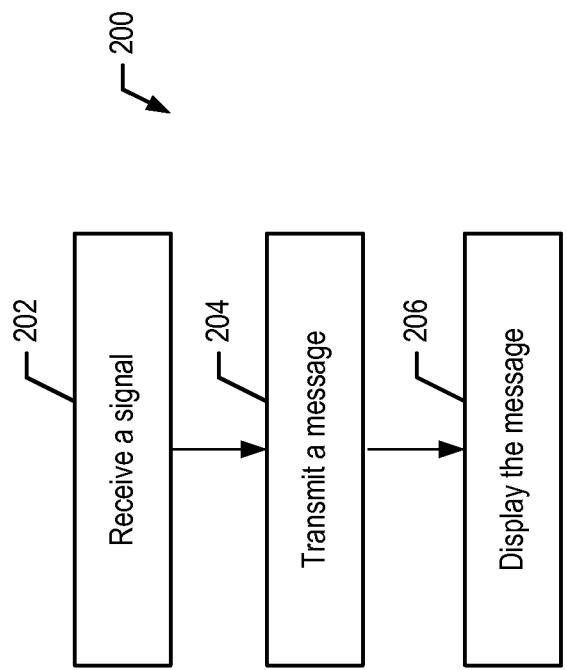
FIG. 2 depicts a schematic diagram of tasks according to an illustrative embodiment of the present subject matter.

FIG. 2 depicts a schematic diagram of tasks according to an illustrative embodiment of the present subject matter 200. At task 202, processor 120 receives a signal from detector 110. The signal is a time varying binary signal. The signal is indicative of the presence of an object at a location with respect to display 130.

At task 204, processor 120 transmits a message to display 130. The message is displayed on display 130 based, at least in part, on a temporal pattern of the signal. In some embodiments, processor 120 along with the message transmits co-ordinates at which the message is to be displayed. At task 206, the message is displayed at display 130.

Figure 3:
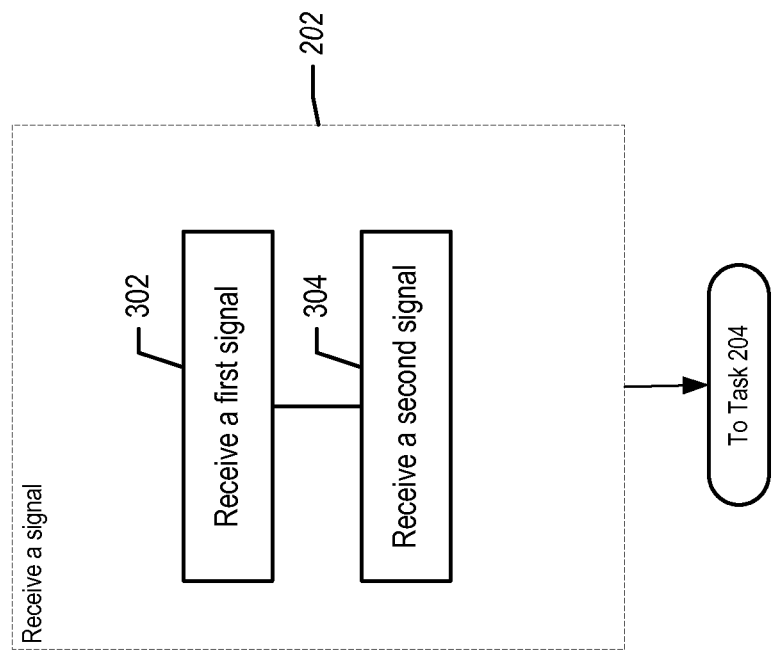
FIG. 3 depicts a schematic diagram of an illustrative embodiment in more detail.

FIG. 3 depicts an illustrative embodiment of task 202 in more detail. In the illustrative embodiment, at task 302, processor 120 receives a first signal from detector 110. The first signal is a time varying binary signal. The first signal is indicative of the presence of an object at a first location with respect to display 130. The first signal comprises a first temporal pattern. At task 304, processor 120 receives a second signal from detector 110. The second signal is a time varying binary signal. The second signal is indicative of the presence of an object at second location with respect to display 130. The second signal comprises a second temporal pattern. Control is then transferred to task 204.

Figure 4:
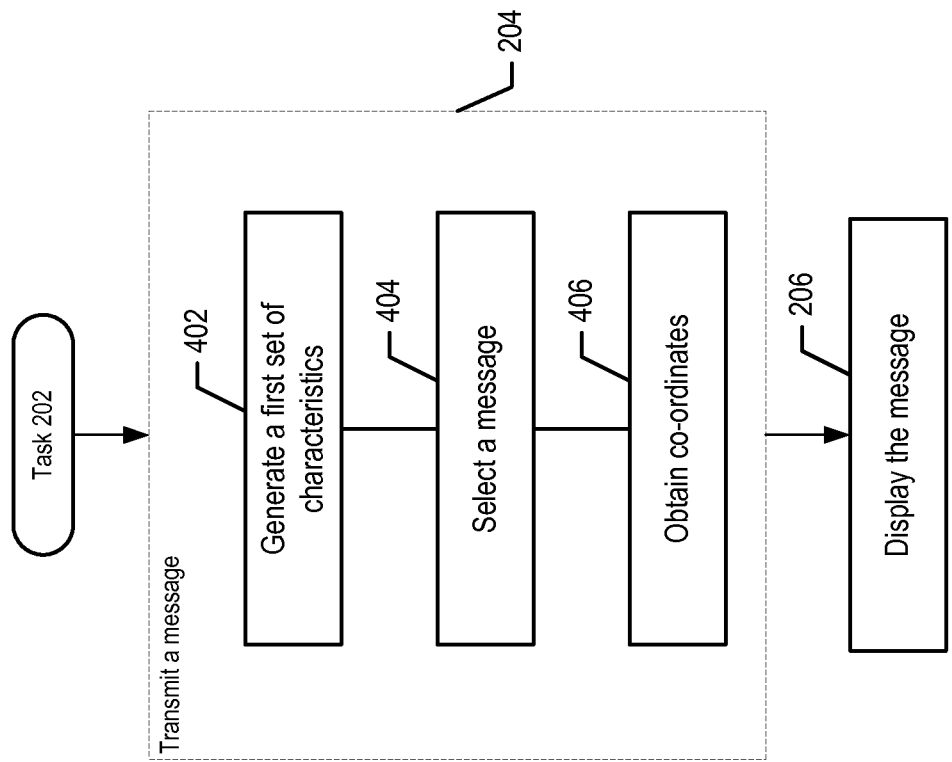
FIG. 4 depicts a schematic diagram of an illustrative embodiment in more detail.

FIG. 4 depicts an illustrative embodiment of task 204 in more detail. In the illustrative embodiment, at task 402, processor 120, generates a set of characteristics based on the first temporal pattern of the first signal. In some other embodiments, processor 120, generates the set of characteristics based on the second temporal pattern of the second signal. In yet another embodiment, processor 120, generates the set of characteristics based on both the first temporal pattern and the second temporal pattern. In some embodiments, processor 120, generates the set of characteristics based on at least one of, the first signal, second signal, first temporal pattern, and second temporal pattern. In some embodiments, the set of characteristics is a set of physical characteristics.

At task 404, processor 120 selects a message. In some embodiments, the message is selected based on at least one of the first signal, second signal, first temporal pattern, second temporal pattern and the set of characteristics.

At task 406, co-ordinates of display 130 at which the message is displayed are obtained by processor 120. The co-ordinates are obtained based on at least one of the first signal, second signal, first temporal pattern, second temporal pattern and the set of characteristics. In some embodiments, a proper subset of display 130 is selected. The subset is selected based, at least in part, on the first temporal pattern of the first signal. In some other embodiments, the subset is selected based, at least in part, on the second temporal pattern of the second signal. In some other embodiments, the subset is selected based, at least in part, on at least one of the first signal, second signal, first temporal pattern, second temporal pattern and the set of characteristics. Control is then transferred to task 206. More details of tasks 206 are discussed below.

At task 206, the message is displayed at the display 130. In some embodiments, the message is displayed based, at least in part, on the first temporal pattern of the first signal. In some other embodiments, the message is displayed based, at least in part, on the second temporal pattern of the second signal. In some embodiments, the message is displayed, at least in part, based on at least one of the first signal, second signal, first temporal pattern, and second temporal pattern. In some embodiments, the message is displayed on the proper subset.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, via a processor, a series of binary signals, each binary signal in the series of binary signals indicating one of a presence or an absence of an object at a location with respect to a display;
   based on a temporal pattern associated with the series of binary signals, determining movement patterns of a plurality of body parts of a person;
   based on the movement patterns, determining an age estimation and a height estimation of the person;
   selecting a message based on the movement patterns, the age estimation, and the height estimation; and
   displaying the message on the display.

2. The method of claim 1, wherein the series of binary signals is a first series of binary signals and the temporal pattern is a first temporal pattern, the method further comprising:
   receiving a second series of binary signals, each binary signal of the second series of binary signals indicating one of the presence or the absence of the object at a second location with respect to the display; and selecting the message further based on a second temporal pattern associated with the second series of binary signals.

3. The method of claim 1, further comprising:
determining a physical characteristic of the object based on the movement pattern; and
selecting the message further based on the physical characteristic.

4. The method of claim 1, the method further comprising:
displaying the message at a first subset of the display; and
shifting the message from the first subset of the display to a second subset of the display according to the movement pattern.

5. The method of claim 1, wherein the series of binary signals is received from one of a proximity detector, an infra-red detector, or an ultrasound detector.

6. The method of claim 1, wherein the series of binary signals is received from an array of proximity detectors.

7. The method of claim 3, wherein the physical characteristic is one of a height or an age.

8. The method of claim 1, wherein the object is a human.

9. The method of claim 8, wherein the movement pattern is associated with one of a hand, a leg, or a neck of the human.

10. The method of claim 1, wherein the series of binary signals is a first series of binary signals, wherein the object is a first object, wherein the location is a first location, wherein the temporal pattern is a first temporal pattern, wherein the movement pattern is a first movement pattern, and wherein the message is a first message, the method further comprising:
receiving a second series of binary signals, each binary signal in the second series of binary signals indicating one of a presence or an absence of the second object at a second location with respect to the display;
based on a second temporal pattern associated with the second series of binary signals, determining a second movement pattern of the second object;
selecting a second message based on the second movement pattern; and
displaying the second message concurrently with the first message.

11. The method of claim 1, further comprising:
based on the temporal pattern associated with the series of binary signals, determining a movement pattern of the object;
determining a distance of the object from the display; and
adjusting a size of the message displayed according to the distance of the object from the display.

12. A system comprising:
a detector;
a display; and
a processor configured to perform operations comprising:
receiving a series of binary signals from the detector, each binary signal in the series of binary signals indicating one of a presence or an absence of an object at a location with respect to the display;
based on a temporal pattern associated with the series of binary signals, determining movement patterns of a plurality of body parts of a person;
based on the movement patterns, determining an age estimation and a height estimation of the person;
selecting a message based on the movement patterns, the age estimation, and the height estimation; and
displaying the message on the display.

13. The system of claim 12, wherein the series of binary signals is a first series of binary signals and the temporal pattern is a first temporal pattern, and wherein the processor is configured to perform further operations comprising:
receiving a second series of binary signals that indicates one of the presence or the absence of the object at a second location with respect to the display; and
selecting the message further based on a second temporal pattern associated with the second series of binary signals.

14. The system of claim 12, wherein the processor is configured to perform further operations comprising:
determining a physical characteristic of the object based on the movement pattern; and
selecting the message further based on the physical characteristic.

15. The system of claim 14, wherein the physical characteristic is one of a height or an age.

16. The system of claim 12, wherein the series of binary signals is received from one of a proximity detector, an array of proximity detectors, an infra-red detector, or an ultrasound detector.

17. The system of claim 12, wherein the series of binary signals is a first series of binary signals, wherein the object is a first object, wherein the location is a first location, wherein the temporal pattern is a first temporal pattern, wherein the movement pattern is a first movement pattern, wherein the message is a first message, and wherein the processor is configured to perform further operations comprising:
receiving a second series of binary signals, each binary signal in the second series of binary signals indicating one of a presence or an absence of the second object at a second location with respect to the display;
based on a second temporal pattern associated with the second series of binary signals, determining a second movement pattern of the second object;
selecting a second message based on the second movement pattern; and
displaying the second message concurrently with the first message.

18. The system of claim 12, the processor configured to perform further operations comprising:
based on the temporal pattern associated with the series of binary signals, determining a movement pattern of the object;
determining a distance of the object from the display; and
adjusting a size of the message displayed according to the distance of the object from the display.

* * * * *